(12) United States Patent
Perier

(10) Patent No.: US 9,510,195 B2
(45) Date of Patent: Nov. 29, 2016

(54) SECURED TRANSACTIONS IN INTERNET OF THINGS EMBEDDED SYSTEMS NETWORKS

(71) Applicant: STMicroelectronics International N.V., Amsterdam (NL)

(72) Inventor: Laurent Perier, New Delhi (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 35 days.

(21) Appl. No.: 14/176,832

(22) Filed: Feb. 10, 2014

(65) Prior Publication Data

US 2015/0229654 A1    Aug. 13, 2015

(51) Int. Cl.
| | |
|---|---|
| *H04L 29/06* | (2006.01) |
| *H04W 12/06* | (2009.01) |
| *H04W 4/00* | (2009.01) |
| *H04W 12/02* | (2009.01) |

(52) U.S. Cl.
CPC .......... *H04W 12/06* (2013.01); *H04L 63/0227* (2013.01); *H04L 63/0428* (2013.01); *H04L 63/123* (2013.01); *H04L 63/1408* (2013.01); *H04W 4/005* (2013.01); *H04W 12/02* (2013.01)

(58) Field of Classification Search
None
See application file for complete search history.

(56) References Cited

U.S. PATENT DOCUMENTS

| | | | | |
|---|---|---|---|---|
| 2005/0010765 | A1* | 1/2005 | Swander et al. | ............... 713/166 |
| 2007/0124577 | A1* | 5/2007 | Nielsen et al. | ............... 713/151 |
| 2007/0186282 | A1* | 8/2007 | Jenkins | ............... H04L 63/1416 726/22 |
| 2007/0294738 | A1* | 12/2007 | Kuo | ................... H04N 21/4263 725/116 |
| 2008/0163207 | A1* | 7/2008 | Reumann | ............ H04L 63/0263 718/1 |
| 2009/0135018 | A1* | 5/2009 | Veillette et al. | .............. 340/657 |
| 2011/0040960 | A1* | 2/2011 | Deierling | .............. G06F 21/572 713/2 |
| 2012/0005369 | A1* | 1/2012 | Capone | ................. H04L 69/161 709/236 |
| 2012/0216034 | A1* | 8/2012 | Chen | ................... H04L 63/0823 713/153 |
| 2013/0061313 | A1* | 3/2013 | Cullimore et al. | ............. 726/13 |
| 2014/0164760 | A1* | 6/2014 | Hybertson | .................... 713/153 |
| 2014/0201828 | A1* | 7/2014 | Yoo | ................................ 726/13 |

* cited by examiner

Primary Examiner — David Pearson
(74) Attorney, Agent, or Firm — Seed IP Law Group LLP

(57) ABSTRACT

A secure network enabled device has a distinct security module and lacks a human user input interface. The security module is formed in an integrated circuit. The security module is initialized. Data is electronically communicated to and from the secure network enabled device via at least one transceiver. The security module is configured to test the integrity of a subset of the data communicated to the secure network enabled device, and the security module is configured to test the integrity of a transaction protocol, which governs the stream of data bits of the data communicated to the secure network enabled device.

19 Claims, 7 Drawing Sheets

SECURED TRANSACTIONS IN INTERNET OF THINGS EMBEDDED SYSTEMS NETWORKS

BACKGROUND

Technical Field

The present disclosure generally relates to machine to machine electronic data communications and, more particularly, but not exclusively, relates to machines that communicate with each other but not directly with humans.

Description of the Related Art

Many machines include embedded microprocessors. The embedded microprocessors control sensors, actuators, interfaces, communications peripherals, and many other devices. For example, embedded microprocessors are found in industrial machines, building HVAC systems, motor vehicles, public utility meters, automated tollbooths, public water supply testing and filtration systems, and many other types of apparatus.

The embedded processors found in machines often direct the communication of data between the machine and a central computing server. The central computing server typically receives data from a plurality of machines. In many cases, the central computing server is configured to control the machines with which it communicates.

For example, a public utility water and sewage district controls plumbing distribution lines to individual homes and businesses. The district measures one or both of the amount of water flowing into the home or business, or the amount of waste material flowing out of the home or business. Based on the measured flow, the owner of the home or business receives an invoice from the public utility district.

In many cases, a network enabled device (e.g., a smart utility meter) communicates service usage data back to a computing server of the public utility district. The computing server receives the service usage data and identifies the smart utility meter that sent the data. The computing server correlates the identity of the smart utility meter with a service address, and the computing server automatically generates the invoice that is sent to the service address.

In some cases, the computing server is able to send control commands back to one or more smart utility meters. The control commands may, for example, limit the amount of services that are provided to the address via controls of particular valves, switches, or other devices.

BRIEF SUMMARY

A new device and method provide secure data communications between machines. In an evolving generation of machines, the machines communicate with each other in an infrastructure generally known as the Internet of Things (IoT). An accepted set of protocols, standards, and guidelines permit one device to initiate and carry out communications with another machine even when the two machines have no foreknowledge of each other. Within this evolving generation of machines, there is a growing demand for greater security of data passed between the machines.

Embodiments of a secure network enabled device include a security module embedded in the integrated circuit.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
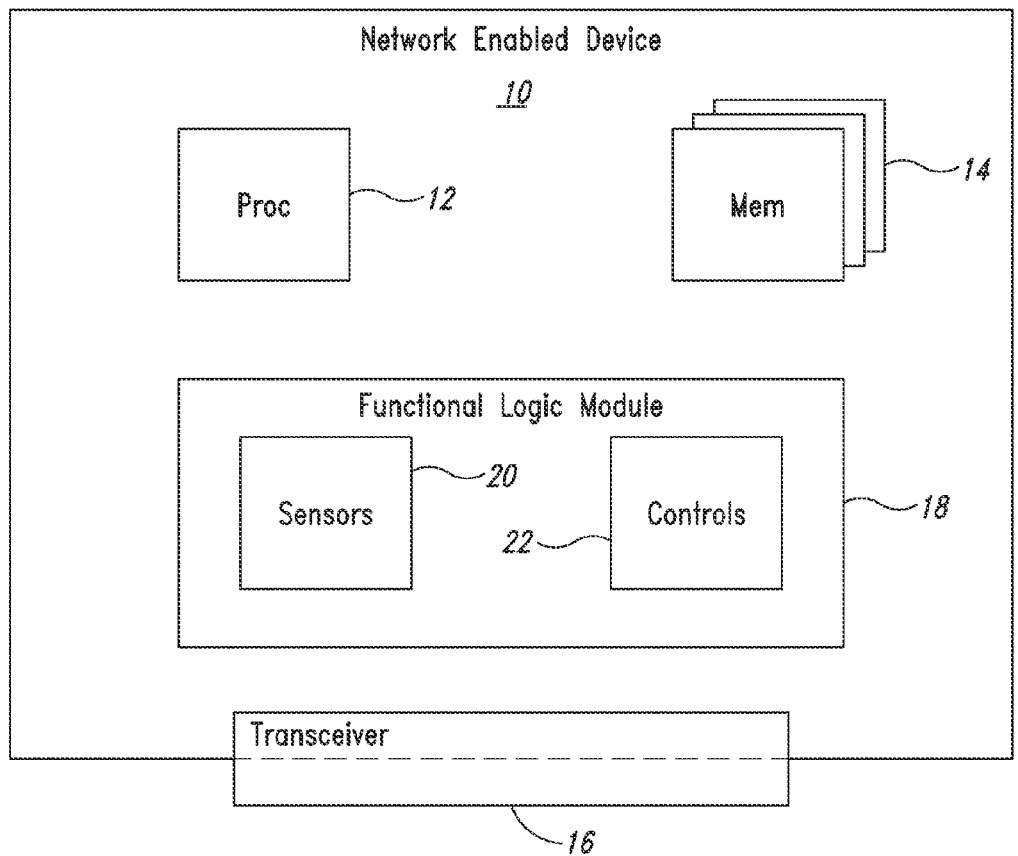
FIG. 1 is a block diagram representation of a conventional network enabled device.

In an evolving generation of machines, the machines communicate with each other in an infrastructure generally known as the Internet of Things. The Internet of Things bears similarities to the wide area network (WAN) generally known as the Internet and even shares some of the same infrastructure. That is, the conventional Internet includes wired and wireless communication paths between end-user computing devices, computing servers, network switches, repeaters, modems, access points, and the like. The Internet of Things may use the wired and wireless communication paths of the conventional Internet to pass data.

Different from the conventional Internet, endpoint devices associated with the Internet of Things often include machines that do not have traditional user input and output interfaces. For example, an endpoint machine communicatively coupled into the Internet of Things will often be configured without a display controller, a keyboard controller, a mouse controller, a touch controller, or any other human user input and output communication interface often associated with a conventional Internet device (e.g., a personal computer (PC), a smart phone, a personal digital assistant (PDA), a tablet, a laptop computer, and the like). The machine may include certain annunciators, switches, sensors, rudimentary displays, wired or wireless control devices, and the like. Nevertheless, the machine will typically not have the type of human interfaces generally associated with a computing device that communicates via the conventional Internet.

Any machine associated with the Internet is typically assigned an Internet Protocol (IP) address. The IP address is sufficient to uniquely identify the machine within a particular network. In some cases, a single machine is uniquely identified within the broad Internet. That is, the machine can bi-directionally communicate in a one-to-one relationship with another machine coupled to the Internet.

In some cases, a single machine has an IP address that is unique within a local area network (LAN). In this circumstance, the local area network has a machine coupled to the Internet, and from within the LAN, other machines are able to communicate to machines coupled to the Internet. In this case, two or more machines are configured in a LAN, and a designated machine in the LAN has an IP address unique on the Internet. Each of the several machines in the LAN can communicate through the designated machine to other Internet-accessible machines.

Internet of Things machines are currently in their infancy. Many conventional machines that have not previously been coupled to the Internet are now being configured for Internet communications. That is, the conventional machines are being configured with a transceiver and other hardware and software to enable Internet communications. The machine is assigned an IP address, which is unique within a LAN or within the broad Internet.

The types of machines now being configured for Internet communications perform industrial functions, commercial functions, consumer functions, or other functions. These machines may include vending machines, packaging equipment, utility meters, parking meters, factory automation, remote antenna monitoring equipment, automotive vehicles, trains, and many, many more. These devices, which now include hardware and software that enable Internet communications, are referred to as network enabled devices. Furthermore, even though these devices are still in the infancy of the Internet of Things, they are nevertheless referenced herein as conventional network enabled devices.

FIG. 1 is a block diagram representation of a conventional network enabled device 10. The network enabled device 10 of FIG. 1 includes a processing unit 12. The processing unit 12 may be a single processing unit such as a microprocessor or a microcontroller, or the processing unit may be a formation of multiple processing units. The processing unit 12 may be or include one or more field programmable gate arrays (FPGA), application specific integrated circuits (ASIC), digital signal processors (DSP), central processing units (CPU), or other like devices. The processing unit 12 of a network enabled device 10 may be broadly referenced herein as a CPU. That is, the processing unit 12 may be one or more of a microprocessor, a microcontroller, an FPGA, an ASIC, a DSP, or a CPU.

A memory 14 is included in the network enabled device 10. Memory 14 may include any combination of volatile and non-volatile non-transitory computer-readable media (CRM) for reading and writing data. Volatile computer-readable media includes, for example, random access memory (RAM). Non-volatile computer-readable media includes, for example, read only memory (ROM), magnetic-based memory, phase change memory, flash memory, and the like.

Stored in memory 14 may be a particular collection of software instructions executable by the processing unit 12 in order to carry out some functions of the network enabled device 10. The software instructions operatively configure hardware and other software in the network enabled device 10 so that electronic data may be communicated through a network communication path to another network enabled device 10. Information related to the network enabled device 10 may be stored in a file system in memory 14.

The network enabled device 10 of FIG. 1 includes one or more transceivers 16 integrated within or otherwise coupled thereto. The one or more transceivers are configured to electronically communicate data generated by the network enabled device 10 or otherwise stored in a memory of the network enabled device 10. The data is communicated to another network enabled device (not shown). The data is generally constituted as a plurality of individual data bits (i.e., datums).

The one or more transceivers 16 may be implemented in a single transceiver circuit or multiple transceiver circuits. The transceiver module 16 may be integrated within the network enabled device 10, coupled to the network enabled device 10, or the transceiver 16 may include first structures that are internal to the network enabled device 10 and second structures that are external to the network enabled device 10. Generally speaking, the transceivers 16 of FIG. 1 are capable of electronically facilitating communication of data from one machine to another machine via direct connection or via a communication path that includes one or more access points, routers, switches, hubs, modems, satellites, and other communications media technologies.

The network enabled device 10 of FIG. 1 includes a functional logic module 18. The functional logic module 18 generally includes one or more logic modules of hardware, software, or a combination of hardware and software. For example, the functional logic module 18 may include sensors module 20, controls module 22, and other modules (not shown). The sensors module 20 will typically include electronic circuits that measure, gauge, test, or otherwise detect a physical manifestation and convert the manifestation into an electronic signal. The controls module 22 will typically include electronic circuits that direct a physical device associated with the network enabled device. Either or both of the sensors module 20 and the controls module 22 may include electronic circuitry and executable or other software.

Figure 2:
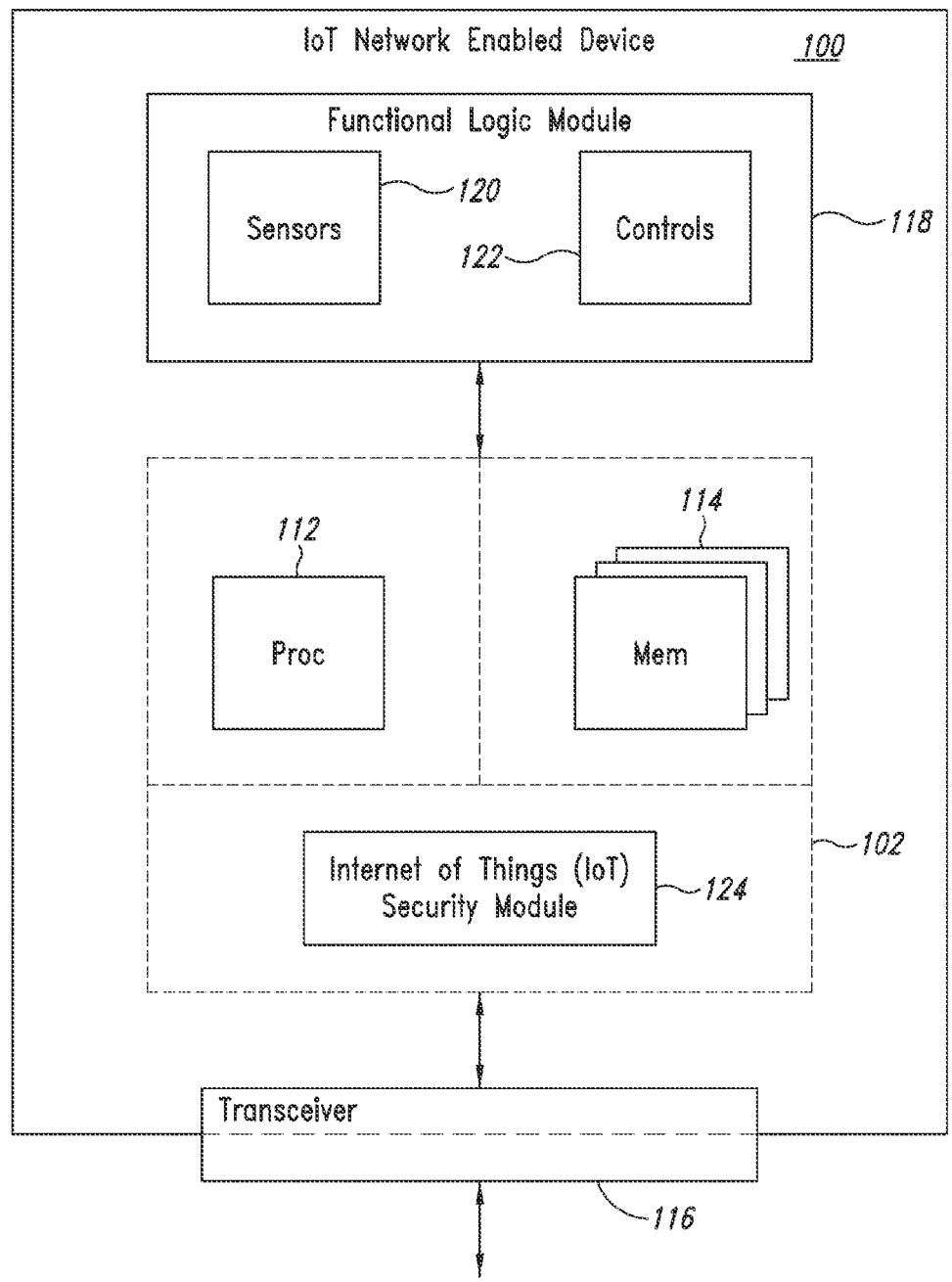
FIG. 2 is a block diagram representation of a network enabled device configured to provide secured transactions in Internet of Things embedded systems networks.

FIG. 2 is a block diagram representation of a network enabled device 100 configured to provide secured transactions in Internet of Things embedded systems networks. The secure network enabled device 100 of FIG. 2 includes a processing unit 112, at least one memory 114, at least one transceiver 116, a functional logic module 118, a sensors module 120, and a controls module 122. The secure network enabled device 100 also includes an Internet of Things security module 124.

The functional logic module 118, sensors module 120, and controls module 122 of FIG. 2 generally correspond, respectively, to the functional logic module 18, sensors module 20, and controls module 22 of FIG. 2.

The processing unit 112 may be a processing unit 12 of the type illustrated in FIG. 1. The memory 114 may be a memory 14 of the type illustrated in FIG. 1. As illustrated in FIG. 2, the processing unit 112, memory 114, and IoT security module may be optionally configured together in any arrangement. That is, each of the modules 112, 114, and 124 may be configured independently with one other module, or with two or more other modules. In some cases, a transceiver 116 may also be configured with one or more of the processing unit 112, memory 114, IoT security module 124, and other modules.

In some cases, memory 114 includes separate sections or distinct memory devices dedicated to a particular structure in the secure network enabled device 100. For example, the security module 124 may have its own dedicated section or device of memory 114. Along the same lines, the processing unit 112 in some cases includes a dedicated section or device of memory 114. A dedicated memory structure may facilitate secure data collection, storage, and communication.

A particular collection of software instructions executable by processing unit 112 and stored in memory 114 may be similar or even identical to software instructions stored in memory 114 of FIG. 1. That is, in some cases, the secure network enabled device 100 of FIG. 2 may operate exactly like a network enabled device 10 of FIG. 1 except for the addition of an IoT security module 124.

The secure network enabled device 100 of FIG. 2 includes one or more transceivers 116 integrated within or otherwise coupled to the secure network enabled device 100. The one or more transceivers 116 electronically communicate data into and out from the network enabled device 100. The data is communicated to another network enabled device (not shown). The data is generally constituted as a plurality of individual data bits (i.e., datums).

The transceivers 116 of FIG. 2, alone or with cooperation from other modules, may include mechanical, electronic, and software structures that communicate data according to one or more standardized and non-standardized protocols. The protocols may, for example, be governed by the Institute of Electrical and Electronic Engineers (IEEE), International Organization for Standards (ISO), International Telecommunications Unit (ITU), Internet Engineering Task Force (IETF), American National Standards Institute (ANSI), European Telecommunications Standards Institute (ETSI), European Committee for Standardization (CEN), American Society of Heating, Refrigeration, and Air Conditioning Engineers (ASHRAE), Extensible Messaging and Presence Protocol (XMPP) Standards Foundation, Peripheral Component Interconnect (PCI) Industrial Computer Manufacturers Group (PICMG), Telecommunications Industry Association/Electronic Industries Alliance (TIA/EIA), Society of Automotive Engineers (SAE), Military Standard (Mil-STD), and others. Other protocols may be de facto standards or even non-standardized proprietary protocols.

A non-limiting representation of the types of protocols that transceiver 16 may conform to include a Supervisory Control and Data Acquisition (SCADA) protocol, a Controller Area Network (CAN) bus protocol, and a Universal Serial Bus (USB) protocol. The protocols in addition or in the alternative may conform to a satellite communication protocol, a wireless local area network protocol such as an IEEE 802.11 WiFi protocol, a peer to peer protocol such as a Bluetooth protocol, a machine to machine XML (M2MXML) protocol, a BITXML protocol, a Very Simple Control Protocol (VSCP), an infrared protocol, a serial protocol such as RS-232 or RS-485, an IEEE 1394 Firewire protocol, an RP-570 protocol, a ZigBee/RF4CE protocol, an X10 protocol, a Time Synchronized Mesh Protocol (TSMP), a Digital Imaging and Communications in Medicine (DICOM) protocol, an openSAFETY protocol, a Building Automation and Control network (BACnet) protocol, a MODICON bus (MODBUS) protocol, a Digital Imaging and Communications (DICOM) protocol, an Experimental Physics and Industrial Control System (EPICS) bus protocol, a Local Operations Network (LonWorks) protocol, a Very Simple Control Protocol (VSCP), a Fieldbus protocol, or some other.

Generally speaking, the IoT security module 124 is arranged to analyze and in some cases modify data passed into and from the secure network enabled device 100. The acts of analyzing and modifying data may include processing data generated by, or passed in to, the functional logic module 118. The analyzing and modifying may also or alternatively include acts on transaction protocol structures applied to transfer the data.

Figure 3:
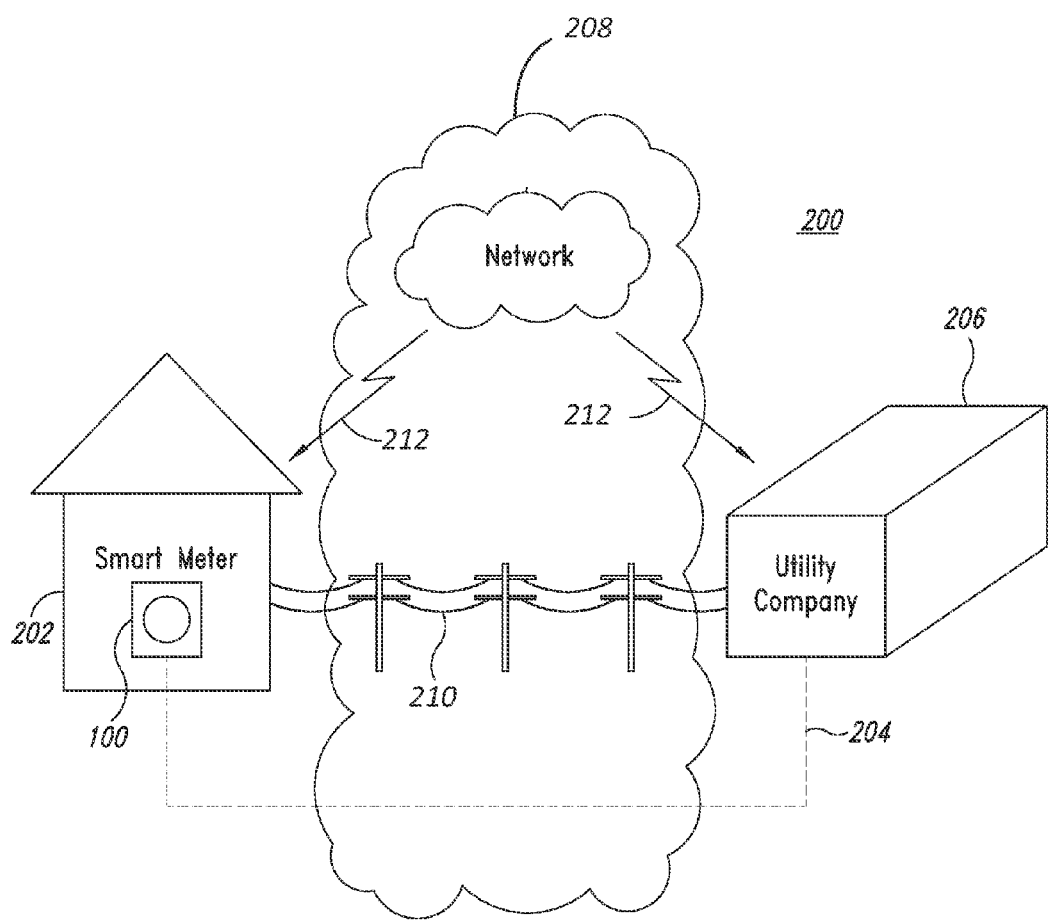
FIG. 3 illustrates an implementation embodiment of a secure network enabled device.

FIG. 3 illustrates an implementation embodiment 200 of a secure network enabled device 100. The secure network enabled device 100 is embodied as a utility meter adjoined to a property 202 such as a home. The utility meter secure network enabled device 100 may be a device that regulates, controls, and additionally or alternatively measures a resource 204 such as water, sewage, natural gas, electricity, television programming, network data (e.g., Internet traffic), or some other resource delivered to the property. In the embodiment of FIG. 3, a utility company 206 provides the resource 204 to the property 202, and the utility company 206 charges money for the resource 204. The amount of money charged by the utility 206 company is based on the measurement of the resource 204 by the smart meter secure network enabled device 100.

In the embodiment 200 of FIG. 3, a network 208 facilitates communications between the smart meter secure network enabled device 100 and the utility company 206. The network 208 is the Internet, and network 208 may also include one or more metropolitan area networks (MAN), local area networks (LAN), peer-to-peer (P2P) networks, personal area networks (PAN), or other networks. Network 208 includes wired communications 210, wireless communications 212, and a combination of wired and wireless communications.

In FIG. 3, one property 202 is illustrated, however, it is understood that a typical embodiment will include dozens, hundreds, or even thousands of properties. Each property will have a smart meter secure network enabled device 100, which communicates with a computing server of utility company 206.

In conventional implementations, network enabled devices 10 (FIG. 1) do not include an IoT security module 124 (FIG. 2), and thus, such conventional implementations are subject to attacks from malicious entities. The malicious entities may include individuals that intend to receive resources 204 without payment. The malicious entities may include others that intend to defraud or damage one or more parts of the resource delivery system.

Different from a conventional implementation, the embodiment of FIG. 3 includes smart meter secure network enabled devices 100, each of which includes an IoT security module 124. The IoT security module 124 is arranged to reduce or in some cases prevent a malicious entity from corrupting data communicated between the smart meter 100 and the utility company 206.

Figure 4:
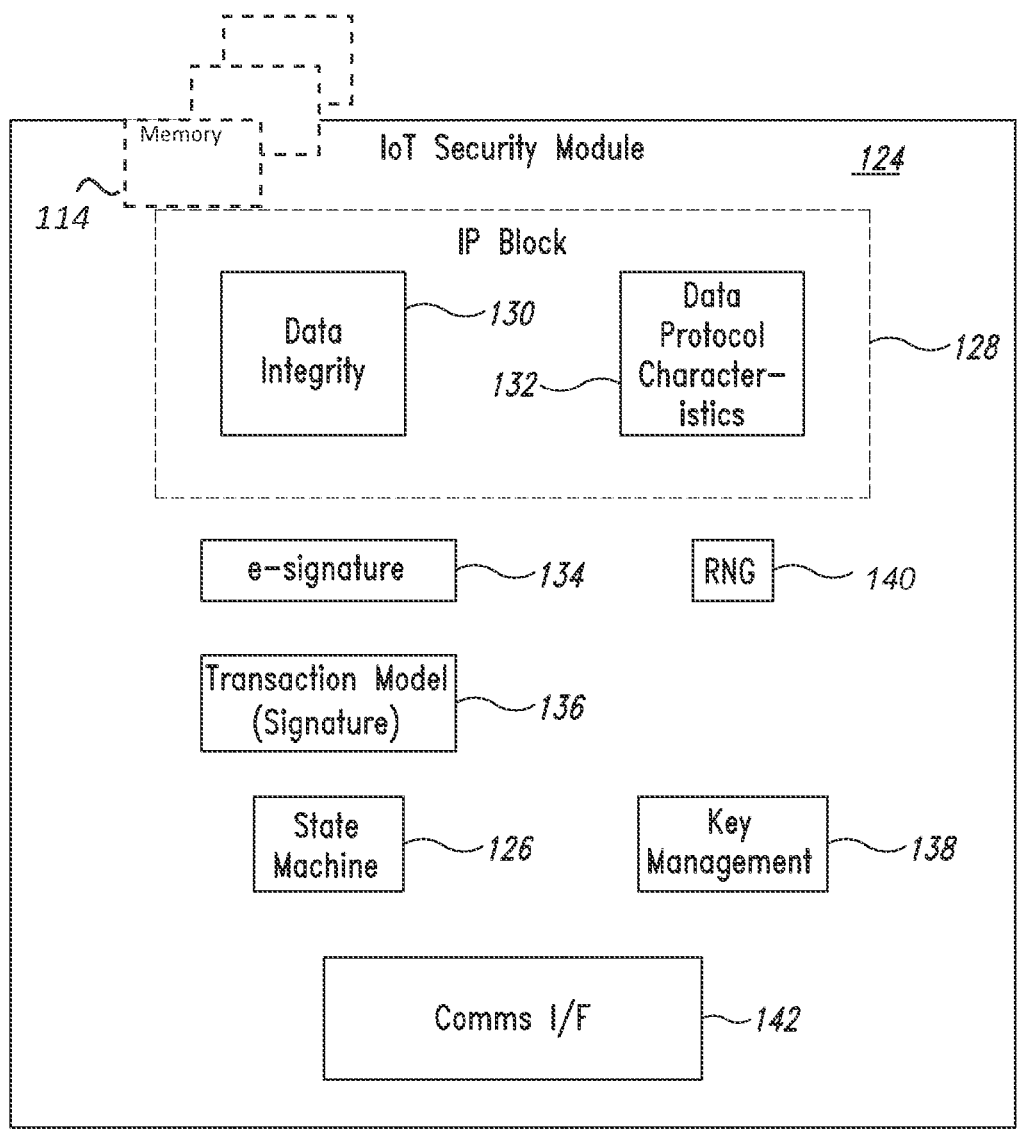
FIG. 4 is a block diagram of an IoT security module.

FIG. 4 is a block diagram of an IoT security module 124. The IoT security module 124 is integrated with or coupled to a secure network enabled device 100. In some cases, the IoT security module 124 is formed as a distinct integrated circuit (IC) module having various electronic circuits formed therein. Other electronic circuits may be formed within the IC module such as those circuits that carry out the functions of the secure network enabled device, or the electronic circuits of the IoT security module 124 may be the only circuits in the IC module. In many cases, the IoT security module 124 is a low cost module that provides acceptably adequate security features to a smart device, and thus, the IoT security module can be cost effectively added to thousands or even millions of industrial network devices.

The IoT security module 124 in FIG. 4 is configured to authenticate transactions that pass data into and from a secure network enabled device 100. Alternatively, or in addition, the IoT security module 124 is configured to authenticate data within transactions passed by the transceiver module of the secure network enabled device 100. Stated differently, the IoT security module 124 will analyze bits of a communicative transaction to ensure, to a computationally reasonable degree, that a particular packet of information conforms to an expected protocol used by the secure network enabled device 100 and has not been tampered with. In addition, or in other embodiments, the IoT security module 124 will analyze data within a packet of information to ensure, to a computationally reasonable degree, that the data within the packet has not been tampered with. In such cases, a computationally reasonable degree may include a known or expected measure of time that malicious computing resources would operate in order to breach the security of the protocol or the data embedded in a packet, for example, by a brute force hacking method.

In many cases, the IoT security module 124 is arranged according to one or more cryptographic models. The cryptographic model is chosen to provide certain benefits to the parties of interest associated with the secure network enabled device 100 and any other communicatively coupled devices.

One benefit made possible by the IoT security module includes the transfer of confidential data. That is, by encrypting data, the information is effectively rendered unavailable or unreadable to individuals, entities, processes, and the like that have not been authorized. Another benefit is that a device that receives encrypted information can verify the identity of the device that sent the information. A third benefit is a receiving device's opportunity to test the integrity of the data to determine whether or not data has been altered, supplemented, or otherwise tampered with, or destroyed by an unauthorized individual, entity, process, or the like. An additional fourth benefit is that upon receipt of the data, the receiving device can prove the information was sent by a specific sending device and not some other rogue device. This fourth benefit may be two-fold. That is, the receiving device can validate the information as having come from a particular sending device, and the sending device cannot deny having sent the information.

Symmetric cryptography generally requires that both a sending device and a receiving device share a piece of common knowledge, such as a multi-bit key value or information that permits each device to derive a multi-bit key value.

In some cases, the IoT security module 124 operates according to symmetric cryptographic algorithms. For example, the IoT security module 124 may include modules configured to encrypt and decrypt data according to an AES algorithm, a DES algorithm, and the like.

Asymmetric cryptography generally involves both a sending device and a receiving device each having a pair of multi-bit key values. Each device has a public that is knowable by all devices, and each device also has a secret key that is kept private. The public key is typically known by all devices that want to secure certain data, and the secret key is typically known only by the device that will gain access to the secured certain data.

For example, a first device and a second device secure data via a public key/private key asymmetric cryptography system. The first device encrypts certain data using a public key associated with the second device. Once encrypted, the certain data is secure because other devices cannot gain access to the real data; instead, the other devices can only access the obfuscated (i.e., encrypted) data. The first device sends the encrypted data to the second device. The second device receives the encrypted data and uses its private key to decrypt the data. The second device, via the decryption, is able to gain access to the real data.

In some cases, the secret key is also known by a key issuing entity, an entity that owns or manages the system, a government agency, and the like. In some cases, the IoT security module 124 includes modules configured to encrypt and decrypt data according to an RSA algorithm or some other asymmetric algorithm.

A hash function is typically an algorithm that maps variable length data to generate data having a fixed length. The fixed length data is typically shorter than the variable length data and, thus, the output of a hash algorithm (e.g., a hash value) may be used to verify whether or not the original data that generated the hash value has changed. In many cases, a hash value is created from certain data to act as a digital signature, which can be applied to authenticate the data. For example, a long string of data is processed by a hash function, which results in a certain hash value. Subsequently, the long string of data is accessed and the accessing entity wants to verify that the data has not been changed. The long string of data can be run again through the hash function, and the newly created hash value can be compared to the earlier created hash value. If the two values are the same, the accessing entity has confidence the original long string of data has not been modified or tampered with.

In some cases, the IoT security module 124 may include modules configured to compute hash values. A hash value can be used as a digital signature. By associating a digital signature with certain data, there can be a computationally reasonable assumption that the certain data is been authorized by a known source.

Operations within the IoT security module 124 are directed by a state machine 126. The state machine 126 is distinct from the processing unit 112. The state machine 126 may be directed by software though often, the state machine 126 is formed exclusively in hardware. State machine 126 may include or be a field programmable gate array (FPGA) logic, application specific integrated circuit (ASIC) logic, microprocessor logic, microcontroller logic, or other like circuitry. In some cases, the state machine is formed with simple combinatorial gate logic. The gate logic, in such cases, is arranged to analyze input data and advance or not advance the state machine through various states based on conditions applied to certain ones of the gates.

In some cases, a device or section of memory 114 is integrated within the secure network enabled device 100. In these cases, the memory 114 is broadly available for use by processing unit 112, functional logic module 118, and transceiver 116. Also in these cases, a distinct section or device of memory 114 is dedicated to the IoT security module 124 and unavailable to other modules in the secure network enabled device 100. Accordingly, the memory 114 of FIG. 4 is illustrated as having structures optionally within or dedicated to the IoT security module 124.

In some cases, the memory 114 dedicated to the IoT security module 124 includes one-time programmable (OTP) memory. The memory 114 dedicated to the IoT security module 124 may be used to store a unique identifier (ID), a unique network address, a seed value, a root key, a public key, a private key, a signature value, or some other data. Storing a unique identifier or other security information in OTP memory can prevent a malicious actor from altering the memory for nefarious purposes. In these cases, certain information such as seed values, signature values, private key values, or other secret data can be trusted because it is programmed into the module in a controlled, secured environment.

In additional or other cases, the memory 114 dedicated to the IoT security module 124 is some other individual volatile and non-volatile non-transitory computer-readable media (CRM), or combination thereof.

The state machine 126 may be directed by executable software instructions stored in a selected section or device of memory 114. In some cases, software instructions directed to the processing unit 112 and the state machine 126 may be contemporaneously compiled, assembled, linked, and stored in memory 114. In other cases, software instructions directed to the state machine 126 are separately compiled, assembled, linked, and stored in memory 114.

Several sub-modules arranged within the IoT security module 124 support operations of the state machine 126. These modules may include at least one of a data integrity module 130 and a data protocol characteristics module 132, optionally formed as part of a single IP block 128. Other sub-modules of the IoT security module 124 that support operations of the state machine 126 may include an electronic signature module 134, a transaction model module 136, a key management module 138, and a random number generator module 140.

The IoT security module 124 includes a communications interface 142. The communications interface 142 provides a mechanism whereby the IoT security module 124 can monitor and, in addition process data passing through, transceiver 116. The communications interface 142 may, in some cases, access all data that passes through the transceiver 116. Thus, in cases where the only data passing into and out of the secure network enabled device 100 goes through transceiver 116, all input and output data traffic can be subject to analysis.

In one embodiment, the communications interface 142 is a single electronic data interface arranged to receive commands to control the IoT security module 124. That is, particular control commands to direct the state machine 126 are communicated through the communications interface 142 from the transceiver 116, the processing unit 112, or some other module. In such an embodiment, the communications interface 142 may be the sole interface to receive commands to control the IoT security module 124.

The IoT security module 124 of FIG. 4 is absent a keyboard controller, a mouse controller, a display controller, or certain other controllers generally directed toward devices that support a human interface. Accordingly, the passage of control information and, alternatively or in addition to, operational data into and from the IoT security module 124 is very limited. In some cases, control information and data can be passed via memory 114. In other cases, control information and data can be passed via the communications interface 142.

The data protocol characteristics module 132 is configured to authenticate the structure of data sent to the secure network enabled device 100. The data sent to the secure network enabled device 100 will conform to a particular protocol, which may for example structure the data into one or more packets. In such cases, the packets will include determined bit structures wherein certain ones or fields of bits will convey information associated with other bits of the same packet or other packets. By performing analysis on the data as it is passed into the secure network enabled device 100, the data protocol characteristics module 132 is able to validate the conformance of the data to the particular protocol.

The data integrity module 130 is configured to authenticate data passed into the secure network enabled device 100. The data integrity module 130 is arranged to provide state information to the state machine 126 during the process of data authentication. For example, when a packet of information is sent to the secure network enabled device 100, the packet is received at the transceiver 116. The data integrity module 130 may control operations within the IoT security module 124 to analyze data embedded within the packet. The analysis may include decrypting the data, validating a signature associated with the data, and validating that the data was sent by a known sending device.

As discussed herein, the data integrity module 130 and the data protocol characteristics module 132 are arranged to process data sent to an associated secure network enabled device 100. It is recognized that the modules may also be applied to process data that will be sent from the secure network enabled device 100.

Modules of the IP block 128 may cooperate with an electronic signature module 134. In some cases, the electronic signature module 134 is arranged to perform hash functions to generate signatures. The electronic signature module 134 may include particular arrays that are used as a hash table or a digest to perform signature generation and, in addition or in the alternative, signature verification tasks. Is some cases, the electronic signature module includes an OTP section of memory 114 useful for storing a single signature. In this way the IoT security module 124 can be identified one time, and the identity persists throughout the life of the security module 124.

A transaction model module 136 may be used to direct operations of the electronic signature module 134. The transaction model module 136 may also be used to analyze and process certain bits, structures, sequences of data, and the like to verify a stream of data for compliance with a particular protocol. That is, the transaction model module 136 may isolate certain bits or bit sequences of an incoming or outgoing packet, test the bits, and produce signals to advance the state machine 126.

A key management module 138 may direct operations associated with the generation, use, dissemination, and storage of key values of the IoT security module 124. The key management module 138 typically cooperates with other modules to store and retrieve public and private keys, which are used to encrypt data that will be sent and decrypt data that is received. The key management module 138 may store root keys of the device.

A random number generator 140 produces random numbers for use in the IoT security module 124. The random numbers may be truly random, or the random numbers may be pseudo-random numbers, which are random within a computationally reasonable level. That is, the numbers are random to extent they are produced with electronic circuitry and generally unpredictable. The random numbers may be used by the IP block 128 modules and other modules to create signatures, for example.

Figure 5:
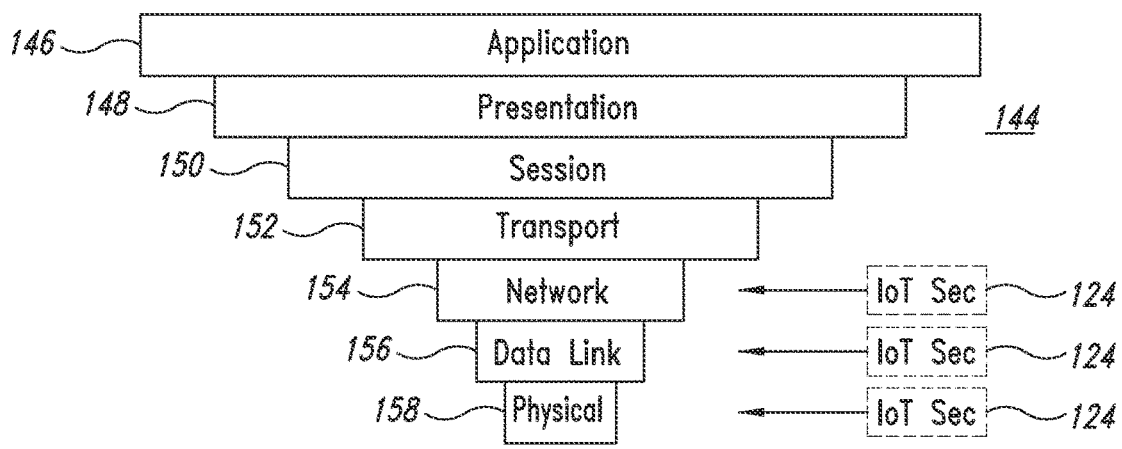
FIG. 5 illustrates an open systems interconnection (OSI) model of a standardized communication system having particular access points for an IoT security module.

FIG. 5 illustrates an Open Systems Interconnection (OSI) model 144 of a standardized communication system having particular access points for an IoT security module 124. One of skill in the art will recognize an application layer 146, presentation layer 148, session layer 150, transport layer 152, network layer 154, data link layer 156, and physical layer 158. Generally speaking, the data protocol characteristics module 132 may have access to bits at the physical layer 158, data link layer 156, and in addition or alternative, the network layer 154.

A physical layer 158 includes the wired or wireless medium infrastructure used to communicate data from one point to another. That is, the physical layer includes the basic networking transmission and reception circuitry of a network. They physical layer is generally concerned with the transmission and reception of each bit or symbol of data rather than bit or symbol sequences of data. The at least one transceiver 116 of the secure network enabled device 100 may include, for example, physical layer electronic circuits to conform to an IEEE 802.11 physical layer protocol, a Bluetooth physical layer protocol, an Ethernet physical layer protocol, or some other protocol.

A data link layer 156 transfers data between adjacent network nodes in a WAN, between neighborhood segments in a MAN, between nodes on the same LAN segment, or between other like nodes. The data link layer 156 includes logic to form bit or symbol collections and transfer the collections between different network entities. That is, data at the data link layer is grouped to form a frame or packet, which may have header or other data link layer management information. In some embodiments, the data link layer management information may be a source address, a destination address, a directional attribute, a frame size, a checksum, a cyclic redundancy check (CRC) value, or other management information. The data link layer may include logic to detect and correct physical layer errors that occur during transmission. Data link layer protocols may conform to a protocol such as Ethernet.

The network layer 154 transfers frames or packets formed at the data link layer 156 between networks or nodes of a network. That is, the network layer 154 forwards and routes frames or packets through intermediate networking devices such as routers. The network layer provides the logic to transfer variable length sequences of data from a source to a destination via one or more networks. Network layer protocols may conform to Internet protocol versions 4 and 6 (IPv4/IPv6), for example.

Embodiments of a secure network enabled device 100 will include an IoT security module 124 that can access data at one or more network communication layers. As illustrated in FIG. 5, for example, the IoT security module 124 may analyze inbound or outbound data at the physical level 158. In some cases, devices that communicate to and from a secure network enabled device 100 will add additional proprietary bits to enhance the security of communications. These extra bits may be inserted at time of transmission and analyzed at the time of reception. Along these lines, extra bits may also be inserted and analyzed at the data link layer or network layer by an IoT security module 124.

FIGS. 6A-6E illustrate several environments where a non-limiting embodiment of a secure network enabled device 100 may be implemented. The environments are non-limiting, and systems within the environment may include one or more secure network enabled devices 100. In the figures, a secure network enabled device 100 may be coupled to another device, such as an airplane. Alternatively, or in addition, the secure network enabled device 100 may be the entire device, for example a cash register. The illustrations are non-limiting, and it is understood that the functional characteristics of the greater device may be such that the secure network enabled device 100 is either coupled to the greater device or integrated therewith.

Figure 6A:
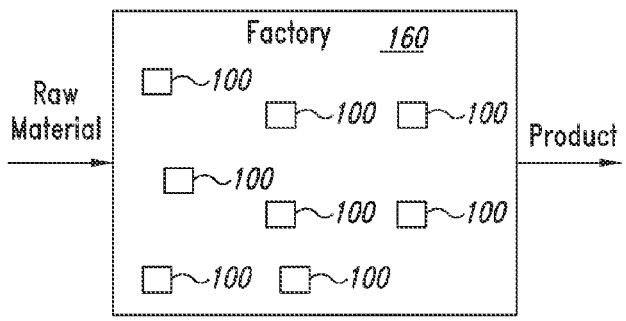
FIGS. 6A-6E illustrate several environments where a non-limiting embodiment of a secure network enabled device 100 may be implemented.

FIG. 6A illustrates a factory environment 160. The factory is shown with raw material going in and product coming out. The raw material may be of any type and the products produced may be of any type. In many cases, several factory buildings are on the same or disparate real estate sites. In some cases, the factories are communicatively networked across wide geographic areas. In the illustration of FIG. 6A, a plurality of secure network enabled devices 100 are illustrated. The devices may be in metal fabricating equipment, plastic fabricating equipment, food preparation equipment, packaging equipment, and many other types of equipment. The secure network enabled devices 100 may communicate with each other. In addition, or in the alternative, the secure network enabled devices 100 may communicate with computing servers remotely located.

Figure 6B:
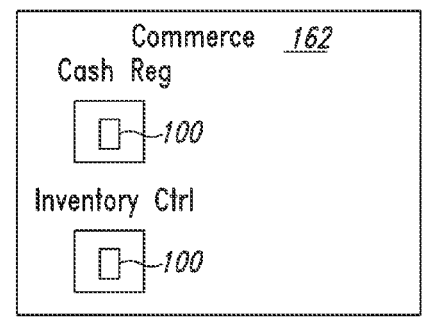

FIG. 6B illustrates commerce facility 162. A cash register having a secure network enabled device 100 is shown, and an inventory control system having a secure network enabled device 100 is also shown. Many other same or different devices could also be included. For example, many cash registers could be included in a single location or in a plurality of locations.

Figure 6C:
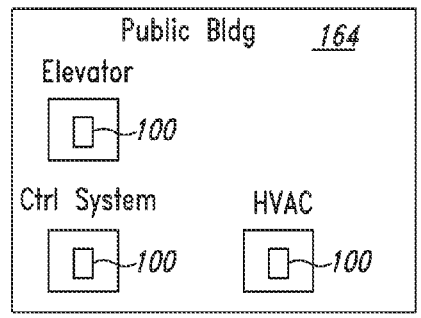

FIG. 6C illustrates a public building 164. The public building may include an elevator control system, a telephone system, an HVAC system, and many other systems that include secure network enabled devices 100. In some cases in the public building, as with other environments, two or more devices with secure network enabled devices 100 are communicatively coupled to each other while one or more different secure network enabled devices 100 are communicatively isolated. In some cases, the public building also controls, monitors, or otherwise analyzes data to and from secure network enabled devices 100 that are not within the building. For example, the public building 164 environment may include secure network enabled devices 100 that communicate with public water supply facilities, public safety system devices, highway systems, and many others.

Figure 6D:
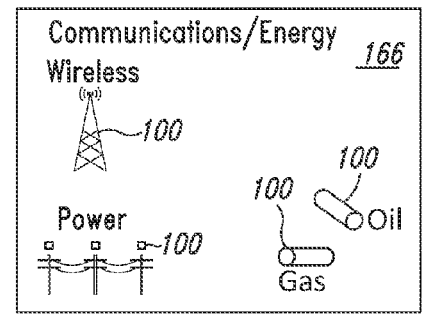

FIG. 6D illustrates a communications/energy infrastructure environment 166. The environment may include private enterprises, public enterprises, or a combination of private and public enterprises. Some examples, which are illustrated, include a wireless communication tower (e.g., cellular, laser, satellite, and the like), power transmission poles, a gas pipeline, and an oil well. Each of the systems within the environment may include secure network enabled devices 100 or other systems that incorporate secure network enabled devices 100. The systems may communicate with each other or with other computing devices via the secure network enabled devices 100.

Figure 6E:
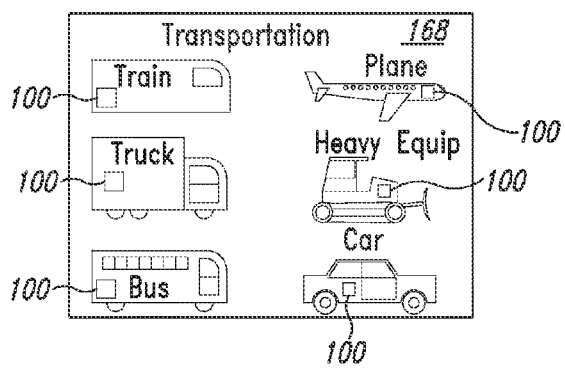

In FIG. 6E, a variety of transportation vehicles are shown. The vehicles may be part of a transportation system 168. The vehicles illustrated include trains, planes, trucks, heavy equipment, buses, cars, and other vehicles that are not shown. The vehicles may have one or more secure network enabled devices 100.

Figure 7:
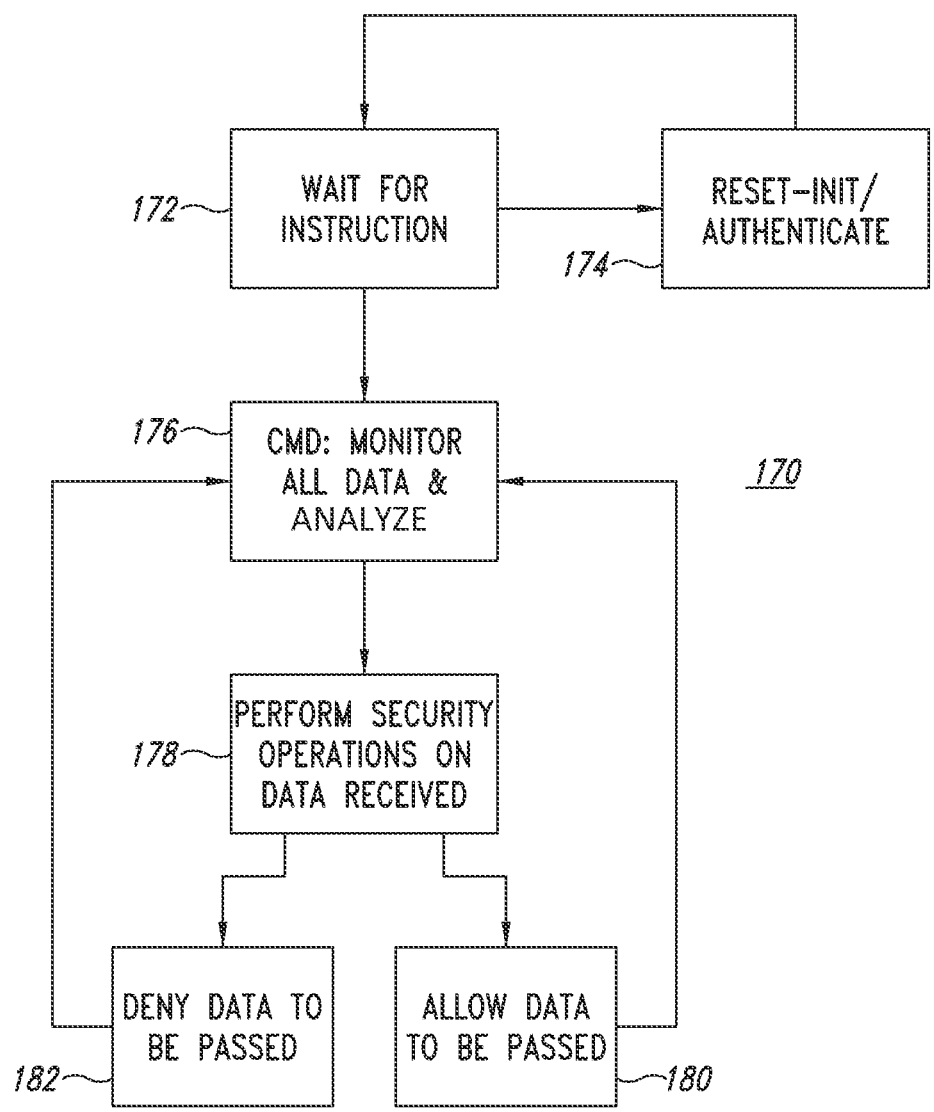
FIG. 7 illustrates a charted method that may be employed in a secure network enabled device.

FIG. 7 illustrates a charted method that may be employed in a secure network enabled device 100. The method is illustrated as a state diagram, however, the illustration of FIG. 7 may also be viewed as a software flowchart, a combinatorial logic circuit, or another electronic computing diagram. The modules illustrated in FIGS. 2 and 4 are identified as carrying out the charted method of FIG. 7. Accordingly, reference is made to structures in FIGS. 2 and 4.

In the example, the secure network enabled device 100 is a smart meter apparatus, though another type of device could also be implemented. The smart meter is a utility meter having a functional logic module 118 to measure a resource (e.g., natural gas) delivered by a utility company. In a conventional system, a similar smart meter may take direction from the utility company regarding the delivery of the resource, and the smart meter will report a measurement of resource delivered back to the utility company. The conventional smart meter, however, is subject to malicious attack via its non-standardized, insecure communication system. Different from the conventional system, the smart meter of FIG. 7 is constructed as an integrated secure network enabled device 100, which has an IoT security module 124.

In the smart meter of FIG. 7, a bidirectional transceiver provides the only communication link to pass electronic data to and from the meter. Accordingly, the smart meter is lacking a human user input interface. The smart meter of FIG. 7 also includes a state machine configured to direct security operations on electronic data passed to and from the smart meter.

The smart meter implementing the secure network enabled device 100 of FIG. 7 is in an idle state 172 waiting for instructions. The secure network enabled device 100 implements a non-limiting asymmetrical cryptographic model for security. The secure network enabled device 100 has an IoT security module 124 configured to manage public and private keys so that data may be encrypted and decrypted according to an RSA algorithm. The public and private keys are stored in a non-volatile memory, some or all of which may be a one-time programmable (OTP) memory.

At some point, the secure network enabled device 100 is reset and moves to a reset authentication and initialization state 174. The secure network enabled device 100 is able to access certain secure information in memory 114, which is not accessible by the processing unit 112 or any other circuits of the smart meter. During reset, the validity of public and private keys, identifiers, network addresses, and other data may be validated. The validation may include a decryption of data stored in memory, a comparison of redundant data stored in a second area of memory, and other validation acts.

In some cases, the IoT security module 124 acts as a firewall for the smart meter. That is, the IoT security module 124 monitors all traffic that travels to and from the smart meter, and the IoT security module identifies and prevents unknown and unexpected entities from communicating with the smart meter. The firewall functionality may be initialized after the processing unit 112 passes a particular initialization command via the communication interface 142. Alternatively, or in addition, the firewall and other initialization may commence after a known entity, for example a computing server of the utility company, sends a command that is received via the one or more transceivers 116.

In one embodiment, the IoT security module 124 is protocol independent. That is, the IoT security module 124 merely encrypts and decrypts data. In other embodiments, the IoT security module 124 is arranged to conform to one or more specific protocols, such as an IP protocol. In such protocol-aware embodiments, the IoT security module 124 may monitor and process data at one or more levels of an OSI model communications system. During a reset and initialization state, the particular features of a protocol-independent system or a protocol-aware system are reset and re-initialized.

In some cases, a manufacturer, a designated vendor, an information technology (IT) practitioner, or some other entity is able to access a secure device or area of memory 114. During one part of a reset initialization state, the designated party may direct particular node identification information, public keys, private keys, address information, or other secure data to be stored in memory 114. Once uploaded and stored in memory 114, the secure data is accessible by the IoT security module 124, but not accessible via any other module within or outside the secure network enabled device 100.

In other cases, particular cryptographic algorithms can be added or modified within the IoT security module during a reset initialization state. The new or updated commands that perform the cryptographic algorithm is in some cases passed as part of electronic data communicated to the smart meter via the at least one electronic transceiver 116. Such electronic data would typically be signed via an algorithm that is wholly or partially included in the IoT security module so that the new algorithm code can be validated upon its receipt.

In one non-limiting embodiment, the IoT security module 124 implements a state machine 126 using software. The software of the state machine in the embodiment may conform in size, architecture, or another characteristic to the software executable by the processing unit 112. In the embodiment, the software of the state machine 126 may thus be managed contemporaneously with the software of the processing unit 112. Such an embodiment may permit a programming task management structure that provides a fail-safe operation able to recover from system failures.

The smart meter of FIG. 7 includes an integrated circuit to carry out various functional tasks of the meter. The processing unit 112 is formed in the integrated circuit and the IoT security module 124 is formed in the same integrated circuit. In this case, the processing unit 112 is a microcontroller. At some point, the microcontroller processing unit 112 passes a command through the communications interface 142 of the IoT security module 124. The command directs the IoT security module 124 to access all of the electronic data passed to and from the smart meter and to analyze at least some of the electronic data passed to and from the smart meter.

In a monitor and analyze state 176, the IoT security module 124 is arranged to access and monitor created data, which will be sent by the transceiver 116. The IoT module 124 is further arranged in the monitor and analyze state 176 to allow the processing unit 112 to access data received by the transceiver 116. That is, different from a conventional smart meter that will allow the processing unit 12 (FIG. 1) to automatically access the received data, the IoT security module 124 will process the received data before allowing the processing unit 112 to access the received data. The smart meter will remain in the monitor and analyze state 176 waiting for data to be created for transmission from the smart meter and in addition, or in the alternative, waiting for data to be received and accepted by the at least one transceiver 116.

Upon the receipt of data for processing, the state machine 126 will direct the IoT security module 124 to perform security operations 178 on the identified electronic data.

In some cases, the security operations include operations on transaction structures of the electronic data. That is, the data protocol character sub-module 132 is directed to analyze a transaction packet or other such structure according to a selected protocol at a physical layer, data link layer, network layer, or some other layer of a particular network protocol (FIG. 5). The analysis may include, for example, an analysis of groups of bits of the electronic data to match certain ones of the bits of the groups to a selected protocol such as an Internet protocol. The analysis may alternatively or in addition include, for example a data length protocol test of analyzing first bits of data in a first position of a stream of data bits to identify a start of packet identifier, subjecting second bits of data in a second position of the stream of data bits to a counting or summation algorithm to produce a result, and comparing the result to third bits of data in a third position of the stream of data bits.

In some cases, the security operations include operations on data that is received or will be sent. The analysis of the data may include validation of a particular signature associated with the data. The signature may be the signature of the smart meter. Alternatively, the signature may be a received signature, and before passing the electronic data to the processing unit 112, the received signature is validated based on other characteristics of the data such as the source address, an expected time parameter, or some other data.

In some cases, the security operations include verifying the integrity of the electronic data to recognize if the data has been tampered with. The integrity verification may include parsing the protocol structures to isolate specific data and performing additional operations such as decryption, cyclic redundancy checks, other checksum operations, data length operations, data source operations, a comparison of data in a first location to data stored in a redundant data location, and the like.

From the state where security operations are performed 178, data is either allowed to be passed (i.e., sent by transceiver 116 or passed to processing unit 112) or denied passage. That is, data enters either an 'allow data to be passed' state 180 or a 'deny data to be passed' state 182.

In the 'allow data to be passed' state 180, the data is processed according to its direction. That is, for outbound data, the transceiver module 116 is permitted to send the data. For inbound data, the processing unit is permitted to process the data. In this way, the IoT security module 124 may perform a firewall function for a machine-to-machine device. The data may be passed physically, for example via a direct memory access (DMA) controller. Alternatively, the data may be passed virtually via a set of data pointers that are transferred within the smart meter. Communication of the data pointers or the data itself is via the communications interface 142.

In the 'deny data to be passed' state 182, in some cases, the data is ignored. That is, when errant or destructive data or transaction structures are identified, various pointers are reset as if the data had never been received. In other cases, the errant or destructive data may be isolated, stored, or otherwise maintained for post-mortem analysis. In still other or additional cases, a new message may be created to affirm the processing of errant data so that a management authority, such as a computing server of the public utility company, can be notified.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. Aspects of the embodiments can be modified and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A secure network enabled device, comprising:
   a functional logic module, the functional logic module arranged as a utility meter to measure consumption of a resource;
   at least one bidirectional transceiver, the at least one bidirectional transceiver providing the only communication to pass electronic data associated with the consumption of the resource to and from the secure network enabled device;
   a first memory;
   a second memory;
   a third memory, the third memory being a one-time programmable memory;
   a microcontroller embedded in an integrated circuit, the microcontroller arranged to execute instructions stored in the first memory, the microcontroller incapable of reading from the second memory and the third memory; and
   a security module embedded in the integrated circuit, the security module arranged to access all of the electronic data passed to and from the secure network enabled device and to analyze at least some of the electronic data passed to and from the secure network enabled device, wherein analyzing at least some of the electronic data includes comparing data in a first data location of the second memory to data stored in a redundant data location in the second memory, the redundant data location in the second memory dedicated to storage of redundant data, the security module arranged to communicate data to and from the second memory, the security module arranged to communicate electronic signature data to and from the third memory.

2. The secure network enabled device of claim 1 wherein the security module comprises:
   a state machine, wherein the state machine is configured to direct security operations on the electronic data passed to and from the secure network enabled device, wherein the state machine is a hardware-based state machine that is distinct from the microcontroller.

3. The secure network enabled device of claim 2 wherein the state machine is configured to direct security operations on transaction structures that include the electronic data.

4. The secure network enabled device of claim 2 wherein the security module comprises:
   a memory interface to the second memory;
   a keys management module to process keys accessed via the memory interface;
   a transaction module; and an electronic signature module arranged to access the third memory.

5. The secure network enabled device of claim 4 wherein the security module further comprises:
a microcontroller interface module.

6. The secure network enabled device of claim 1 wherein arranging the security module to process all of the electronic data passed to and from the secure network enabled device includes arranging the security module to permit or deny passage of all of the electronic data passed to and from the secure network enabled device.

7. The secure network enabled device of claim 1 wherein arranging the security module to process all of the electronic data passed to and from the secure network enabled device includes arranging the security module to verify the integrity of all of the electronic data passed to and from the secure network enabled device.

8. The secure network enabled device of claim 1 wherein the security module provides a firewall to the secure network enabled device.

9. The secure network enabled device of claim 1 wherein the security module implements at least one cryptographic algorithm to decrypt some of the electronic data passed to the secure network enabled device and to encrypt some of the electronic data passed from the secure network enabled device.

10. The secure network enabled device of claim 9 wherein the security module is arranged to update the at least one cryptographic algorithm with a different cryptographic algorithm communicated as part of the electronic data passed to the secure network enabled device via the at least one bi-directional transceiver.

11. The secure network enabled device of claim 1 wherein the resource is at least one of water, sewage, natural gas, and electricity.

12. The secure network enabled device of claim 1 wherein the functional logic module includes an interface to at least one industrial apparatus.

13. A smart meter device, comprising:
a functional logic module arranged to measure consumption of a resource;
a first memory;
a second memory;
a microcontroller embedded in an integrated circuit, the microcontroller arranged to execute instructions stored in the first memory, wherein access to the second memory by the microcontroller is restricted; and
a security module embedded in the integrated circuit and arranged to process network communications data associated with the consumption of the resource that conforms to a multi-layered Open Systems Interconnection (OSI) model, the OSI model including at least a physical layer, a data link layer, and a network layer, the security module arranged to access data only at the physical layer, the data link layer, and the network layer, the security module arranged to recognize if data passing into the smart meter device has been tampered with, wherein recognition of such tampering with includes comparing data in a first data location of the second memory to data stored in a redundant data location in the second memory, the redundant data location in the second memory dedicated to storage of redundant data, the security module further arranged to recognize if a transaction packet complies with a certain communication protocol, the security module arranged to communicate data to and from the second memory.

14. The smart meter device of claim 13 wherein arranging the security module to recognize if a transaction packet complies with a certain communication protocol includes analyzing first bits of data in a first position of a stream of data bits to identify a start of packet identifier, subjecting second bits of data in a second position of the stream of data bits to an algorithm to produce a result, and comparing the result to third bits of data in a third position of the stream of data bits.

15. The smart meter device of claim 13 wherein the security module embedded in the integrated circuit comprises:
a state machine configured to verify integrity of electronic data passed to and from a network enabled apparatus coupleable to the device;
a memory interface to the second memory, the memory interface configured to retrieve at least one public key and at least one private key;
a transaction module; and
an electronic signature module.

16. A method, comprising:
providing a smart utility meter arranged to measure consumption of a resource;
measuring consumption of the resource with a functional logic module of the smart utility meter;
generating data associated with the measured consumption;
storing the data associated with the measured consumption in a first memory device;
restricting the functional logic module from access to a second memory;
initializing a secure network enabled device, the secure network enabled device including a security module formed in an integrated circuit, the secure network enabled device lacking a human user input interface;
electronically communicating at least some of the data associated with the measured consumption to and from the secure network enabled device via at least one transceiver, the at least some of the data associated with the measured consumption formed according to a multi-layered Open Systems Interconnection (OSI) model, the OSI model including at least a physical layer, a data link layer, and a network layer;
initializing the security module;
accessing the at least some of the data associated with the measured consumption via the security module, the access occurring only at the physical layer, the data link layer, and the network layer;
storing the at least some of the data associated with the measured consumption in the second memory as secure data;
testing, via the security module, integrity of a subset of the secure data communicated to or from the secure network enabled device, wherein testing the integrity of the subset of secure data includes comparing data in a first data location of the second memory to data stored in a redundant data location in the second memory, the redundant data location in the second memory dedicated to storage of redundant data; and
testing, via the security module, integrity of a transaction protocol, the transaction protocol governing a stream of data bits of the secure data communicated to or from the secure network enabled device.

17. The method of claim 16, comprising:
detecting a lack of integrity of the subset of the secure data communicated to or from the secure network enabled device; and denying passage of other electronic data based on the detected lack of integrity.

18. The method of claim 16, comprising:
detecting a lack of integrity of the transaction protocol; and
denying passage of other electronic data based on the detected lack of integrity.

19. The method of claim 16, comprising:
detecting a lack of integrity of the transaction protocol;
denying passage of other electronic data based on the detected lack of integrity; and
communicating the secure data from the secure network enabled device to a public utility computing server.

\* \* \* \* \*